(12) United States Patent  
Andersson (10) Patent No.: US 9,682,606 B2  
(45) Date of Patent: Jun. 20, 2017

(54) WHEEL CARRIER

(71) Applicant: CHINA-EURO VEHICLE TECHNOLOGY AKTIEBOLAG, Gothenburg (SE)

(72) Inventor: John-Erik Andersson, Stenungsund (SE)

(73) Assignee: CHINA-EURO VEHICLE TECHNOLOGY AKTIEBOLAG, Gothenburg (SE)

( * ) Notice: Subject to any disclaimer, the term of this patent is extended or adjusted under 35 U.S.C. 154(b) by 0 days.

(21) Appl. No.: 15/374,667

(22) Filed: Dec. 9, 2016

(65) Prior Publication Data

US 2017/0087954 A1    Mar. 30, 2017

Related U.S. Application Data

(63) Continuation of application No. PCT/SE2016/050431, filed on May 12, 2016.

(30) Foreign Application Priority Data

May 13, 2015    (SE) .................................... 1550617-3

(51) Int. Cl.
*B60G 21/05*    (2006.01)
*B60G 7/00*    (2006.01)
(Continued)

(52) U.S. Cl.
CPC .......... *B60G 21/051* (2013.01); *B60B 35/003* (2013.01); *B60B 35/04* (2013.01);
(Continued)

(58) Field of Classification Search
CPC B60G 21/051; B60G 7/008; B60G 2200/445; B60G 2206/50;
(Continued)

(56) References Cited

U.S. PATENT DOCUMENTS 4,613,011 A  *  9/1986  van der Lely ....... B60K 17/303
                                                     180/261
4,671,532 A  *  6/1987  Matschinsky .......... B60G 3/202
                                                     280/124.135
(Continued)

FOREIGN PATENT DOCUMENTS

DE    102008001030 A1    10/2009
DE    102008031123 A1    1/2010
(Continued)

OTHER PUBLICATIONS

The PCT Search Report and Written Opinion mailed Aug. 29, 2016 for PCT application No. PCT/SE2016/050431, 12 pages.
(Continued)

*Primary Examiner* — Darlene P Condra
(74) *Attorney, Agent, or Firm* — Lee & Hayes, PLLC (57) ABSTRACT

A wheel carrier mounted on a rear axle body of a vehicle, which wheel carrier comprises a supporting plate and a bearing plate. The supporting plate coincides with a "virtual king-pin axis" and the properties of the supporting plate are such that the supporting plate may bend around the "virtual king-pin axis" in the area of a flexible supporting section. The bearing plate comprises a section with such properties that the section is allowed to deflect in a lateral direction of the vehicle. When a lateral force $F_{lateral}$ and a brake force $F_{brake}$ are applied to the wheel carrier, e.g. during cornering and braking, the properties of the supporting plate and the bearing plate create lateral force under steer and brake force under steer.

20 Claims, 5 Drawing Sheets

(51) Int. Cl.
*B60B 35/00* (2006.01)
*B60B 35/04* (2006.01)

(52) U.S. Cl.
CPC ......... *B60G 7/008* (2013.01); *B60B 2900/111* (2013.01); *B60B 2900/112* (2013.01); *B60G 2200/20* (2013.01); *B60G 2200/445* (2013.01); *B60G 2206/50* (2013.01); *B60G 2206/722* (2013.01)

(58) Field of Classification Search
CPC .......... B60G 2206/722; B60G 2200/20; B60B 35/003; B60B 35/04; B60B 2900/112; B60B 2900/111
See application file for complete search history.

(56) References Cited

U.S. PATENT DOCUMENTS

| | | | |
|---|---|---|---|
| 7,891,674 B2 | 2/2011 | Vaxelaire et al. | |
| 2010/0059961 A1* | 3/2010 | Kato | B60B 35/08 280/124.166 |
| 2010/0187788 A1* | 7/2010 | Choi | B60G 21/051 280/124.106 |
| 2010/0314933 A1* | 12/2010 | Jakob | B60G 3/14 301/124.1 |
| 2011/0080039 A1* | 4/2011 | Jakob | B60G 3/14 301/124.1 |
| 2011/0133424 A1* | 6/2011 | Nishigaya | B60G 3/16 280/124.125 |
| 2011/0221157 A1* | 9/2011 | Gerrard | B60G 3/20 280/124.135 |
| 2015/0191064 A1* | 7/2015 | Gielisch | B60G 3/145 280/124.129 |
| 2016/0039260 A1* | 2/2016 | Randle | B60G 3/20 280/86.751 |

FOREIGN PATENT DOCUMENTS

| | | |
|---|---|---|
| DE | 102011052376 A1 | 2/2013 |
| EP | 1361084 A2 | 11/2003 |
| EP | 1527911 A1 | 5/2005 |
| EP | 1607310 A1 | 12/2005 |
| EP | 1612068 A1 | 1/2006 |
| FR | 2926248 A1 | 7/2009 |
| FR | 2961778 | 12/2011 |
| WO | WO2016182501 A1 | 11/2016 |

OTHER PUBLICATIONS

Office Action issued in Sweden Patent application No. 1550617-3, mailed Jan. 14, 2016, 6 pages.

* cited by examiner

WHEEL CARRIER

RELATED APPLICATIONS

This application is a continuation of PCT International Application No. PCT/SE2016/050431, filed May 12, 2016, which claims foreign priority to Sweden Application No. 1550617-3, filed on May 13, 2015, both of which are incorporated herein by reference.

TECHNICAL FIELD

The present invention relates generally to a wheel carrier.

BACKGROUND ART

Prior art twist beam rear suspensions are known, which are light and cost efficient and which provide geometrical packaging advantages. They have drawbacks such as low lateral stiffness, lateral force oversteer, brake force oversteer, low longitudinal compliance and unfavorable geometry as trajectory angle and anti-lift angle.

An example of a suspended axle with control of the steering angle is described in U.S. Pat. No. 7,891,674. The flexible axle connect wheel carriers provided on the axle. Each wheel carrier comprises a rigid mounting plate which bears two substantially vertical pivots. The location of the pivots dictates the steering angle. Each vertical pivot comprises elastic articulations, which are provided on the wheel carrier. An elastically deformable element is interposed between the interior surface of each housing and the exterior surface of the hole and a rigid component. The structure of the elastic articulation is dimensioned to minimize steering torque. A drawback with the axle according to U.S. Pat. No. 7,891,674 is that the included details such as ball joints and bushings, which are designed to hold knuckle in a preferred geometry are expensive. Another drawback is that the joints and the bushings induce an extra weight to the design of the axle.

In the above prior art the values of lateral force understeer and brake force understeer depend on specific bushing stiffness' and the position of the virtual king-pin axis.

The wheel carrier according to the invention are able to tune values for lateral stiffness, longitudinal stiffness, lateral force understeer and brake force understeer by means of the properties of the design and material chosen for the wheel carrier.

SUMMARY OF INVENTION

An object of the present invention is to create a wheel carrier mounted on a rear axle body with a simplified design to reduce manufacturing costs and at the same time achieve improved steering properties by means of desired lateral stiffness, improved handling properties by achieving lateral force understeer, and improved brake stability by means of brake force understeer and improved ride comfort by transient insulation compared to the rear axle body according to the prior art document.

The wheel carrier according to the invention, which wheel carrier is mounted on a rear axle body of a vehicle. The wheel carrier comprises a supporting plate and a bearing plate. The supporting plate is attached to the rear axle body and the bearing plate. The supporting plate extends in a substantially transversal direction of the vehicle, and a flexible supporting section is provided in an area where the supporting plate coincide with a "virtual king-pin axis" of the wheel carrier. The bearing plate is parallel to or may in one embodiment be substantially parallel to a wheel bearing of a wheel.

The properties of the supporting plate are such that the supporting plate may bend around the virtual "king-pin axis" in the area of the flexible supporting section when a lateral cornering force and a brake force in a contact patch with ground is applied to the wheel carrier, e.g. during cornering or braking. The bearing plate comprises a first bearing plate section and a second bearing plate section with such properties that the second bearing plate section is allowed to deflect in a lateral direction of the vehicle, when a lateral cornering force or a brake force is applied to a tire at contact patch with ground, e.g. during cornering or braking. Thus the properties of the supporting plate and the bearing plate achieve lateral force under steer and brake force under steer for the wheel mounted on the wheel carrier.

The first bearing section is provided in an area around the center of the wheel bearing and the second bearing plate section is provided in front of the first bearing plate section. The first bearing section, in a lateral direction of the vehicle, is provided with stiff material properties and the second bearing section is provided with less stiff material properties than the first bearing section.

The first and second bearing plate sections, in a longitudinal direction of the vehicle, are both provided with stiff material properties. The second bearing plate section may be provided with one or more apertures, this to create less stiff properties in a lateral direction of the vehicle than the first bearing plate section.

The second bearing section may be manufactured of a material which is provided with same wall thickness or thinner wall thickness than the material of the first bearing section.

The supporting plate comprises a first supporting section and a second supporting section, and the properties of the first and second supporting sections are more stiff than the properties of the flexible supporting section.

The flexible supporting section of the supporting plate is provided with one or more recesses along the virtual "king-pin axis". The first and/or second supporting sections of the flexible supporting section are provided with one or more recesses and/or apertures.

The first supporting section of the supporting plate is attached to a first supporting flange, and the first supporting flange is attached to the first bearing section and the first supporting section, and the second supporting section of the supporting plate is attached to a second supporting flange, and the second supporting flange is attached to the second supporting section and to the rear axle body.

The first bearing plate section is attached to the first supporting section of the supporting plate and the second bearing plate section is rigidly attached to the rear axle body. The supporting plate and bearing plate are preferably manufactured of sheet metal, forged metal or die casted metal. Further, the invention comprises a rear axle body of a vehicle, comprising wheel carriers.

BRIEF DESCRIPTION OF DRAWINGS

The invention is now described, by way of example, with reference to the accompanying drawings, in which.

In the description below, various directions will be given with reference to a vehicle oriented in a forward driving direction. Example of such directions can be lateral, longitudinal, transversal, front, vertical, horizontal. It should particularly be pointed out that the directions are given with reference to a wheel carrier mounted on a rear axle body of a vehicle.

Figure 1:
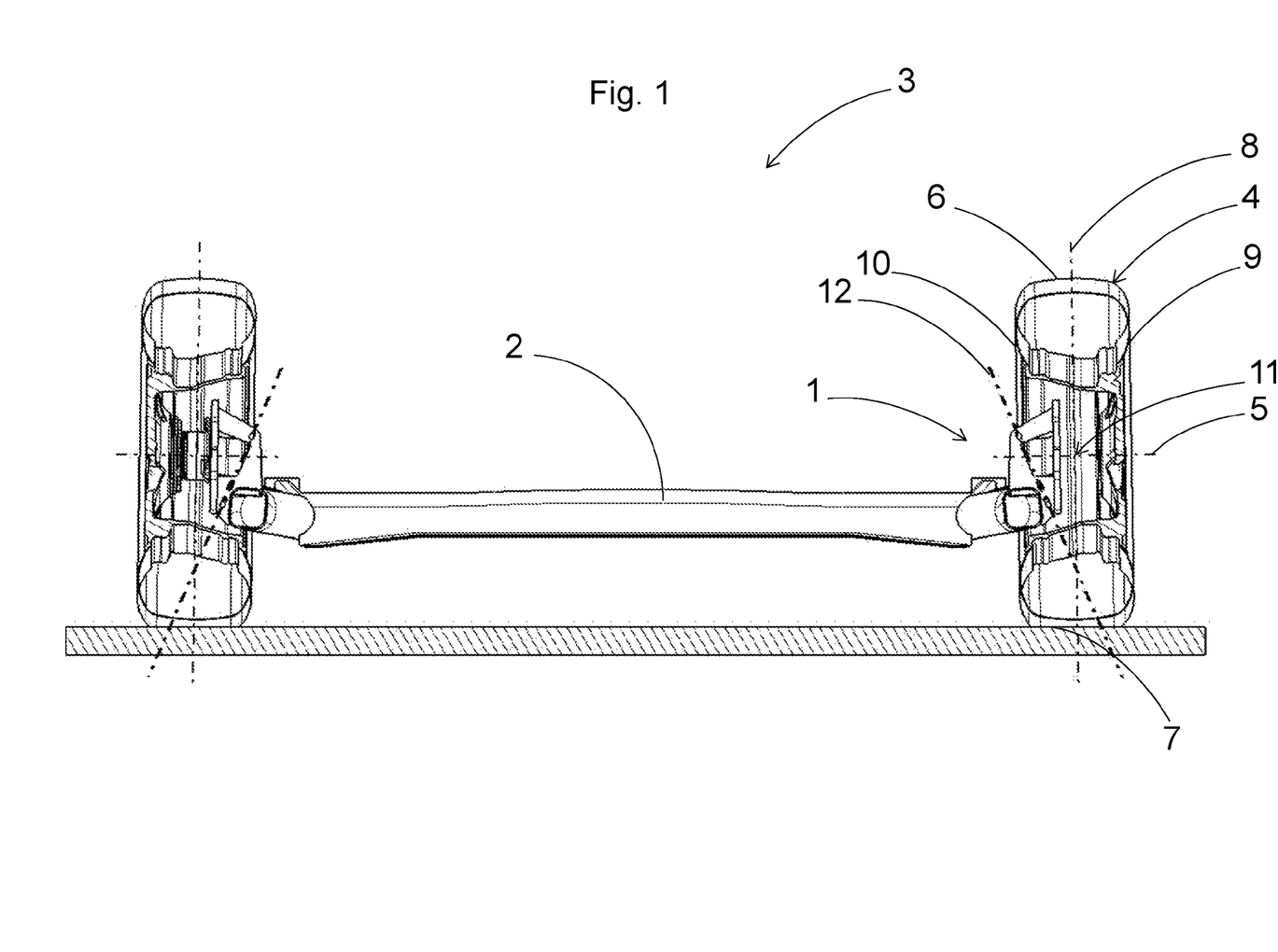
FIG. 1 shows a rear section view of a wheel carrier mounted on a rear axle body of a vehicle according to the invention.

In the following, a detailed description of the wheel carrier 1 suitable for a rear axle body 2 according to the invention disclosed in FIG. 1-5 will be given. Further, FIG. 1 shows a rear section view of a countersteering rear axle 3 comprising a wheel carrier 1 mounted on a rear axle body 2. The rear axle body 2 extend in a transversal direction of the vehicle, and is firmly attached to the wheel carrier 1 whereupon a wheel 4 is mounted. An intersection point between a horizontal axle 5 positioned in the middle between a upper surface 6 and a lower surface 7 of a wheel 4 mounted on the rear axle body 2 and a vertical plane 8 positioned in the middle between the vertical sides 9, 10 of the wheel 4 mounted on the rear axle body 2 constitute the position for the wheel center 11, as shown in FIG. 1. A "virtual king-pin axle" 12 is shown which constitutes the main pivot in a steering mechanism of the countersteering wheel carrier.

Figure 2:
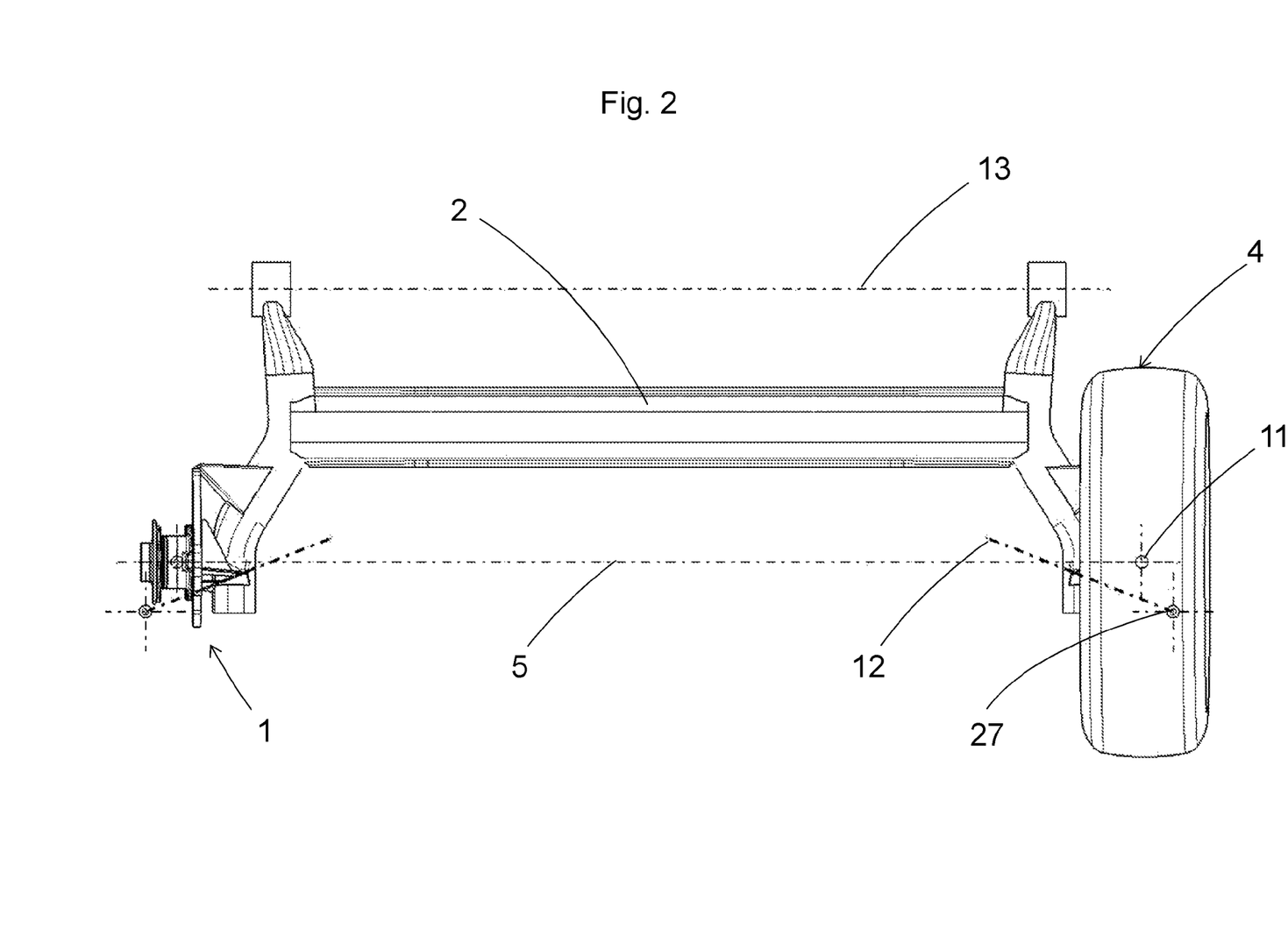
FIG. 2 shows a top view of the wheel carrier on a rear axle body of a vehicle.

FIG. 2 shows a top view of the wheel carrier 1 on a rear axle body 2. The rear axle body 2 is suspended around a suspension axle 13, which is positioned in a front portion of the rear axle body 2, seen in a forward driving direction of the vehicle. The wheel carrier 1 is shown to the left without a wheel and to the right with a wheel 4. The horizontal axle 5 is shown extending through the wheel center 11. The "virtual king-pin axle" 12 is angled and intersect with ground outside the wheel center and behind the horizontal axle 5 and the wheel center 11, seen in a driving direction of the vehicle.

Figure 3:
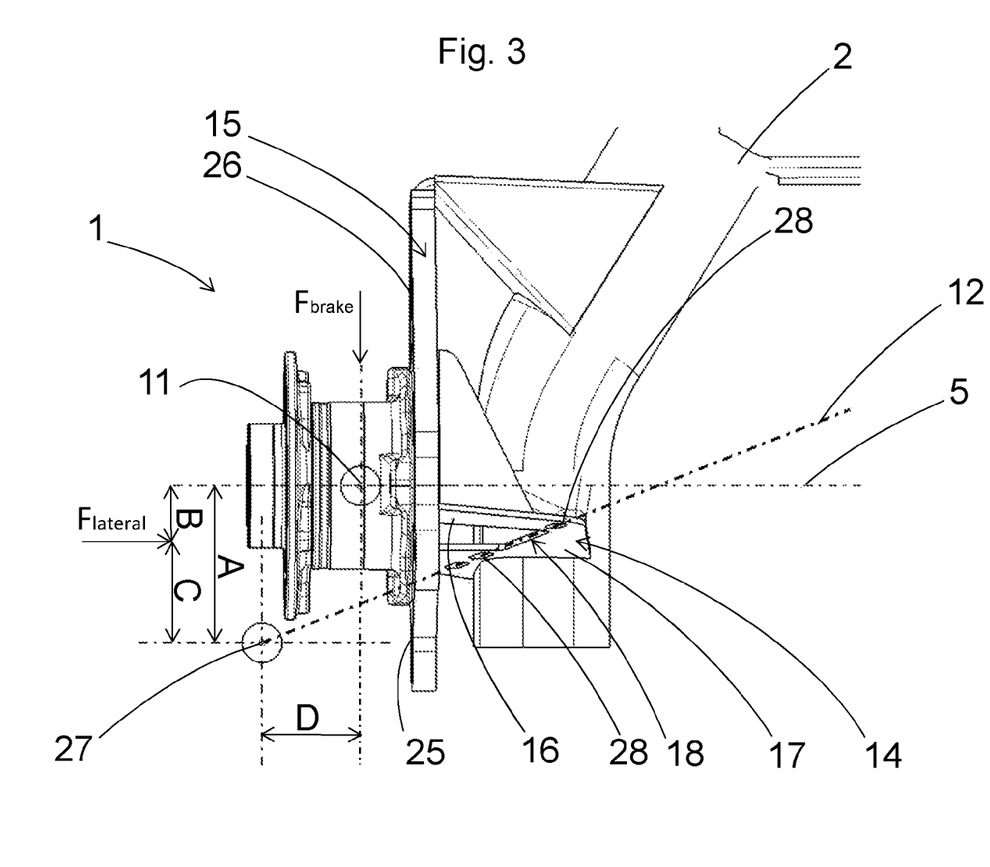
FIG. 3 shows a top view of the wheel carrier on the rear axle body.

FIG. 3 shows a top view of the wheel carrier 1 on the rear axle body 2, comprising a supporting plate 14 and a bearing plate 15. The supporting plate 14 is attached to the rear axle body 2 and the bearing plate 15. The supporting plate 14 is preferably welded together with the rear axle body 2 and the bearing plate 15. The supporting plate 14 is arranged to preferably extend in a substantially transversal direction of the vehicle, and comprises a first supporting section 16 and a second supporting section 17. The first supporting section 16 is attached to the bearing plate 15 and the second supporting section 17 is attached to the rear axle body 2. A flexible supporting section 18 is provided in an area where the first and second supporting sections 16, 17 of the supporting plate 14 coincide, and the whole supporting plate 14 extend in a common virtual geometric plan, in a neutral unaffected condition. The flexible supporting section 18 preferably coincide with a "virtual king-pin axis" 12 of the wheel carrier 1. The properties of the supporting plate 14 are such that the supporting plate 14 bend around the "virtual king-pin axis" 12 in the area of the flexible supporting section 18 when a lateral force $F_{lateral}$ or brake force $F_{brake}$ in a contact patch with ground is applied to the wheel carrier 1, e.g. during cornering or braking.

Figure 4:
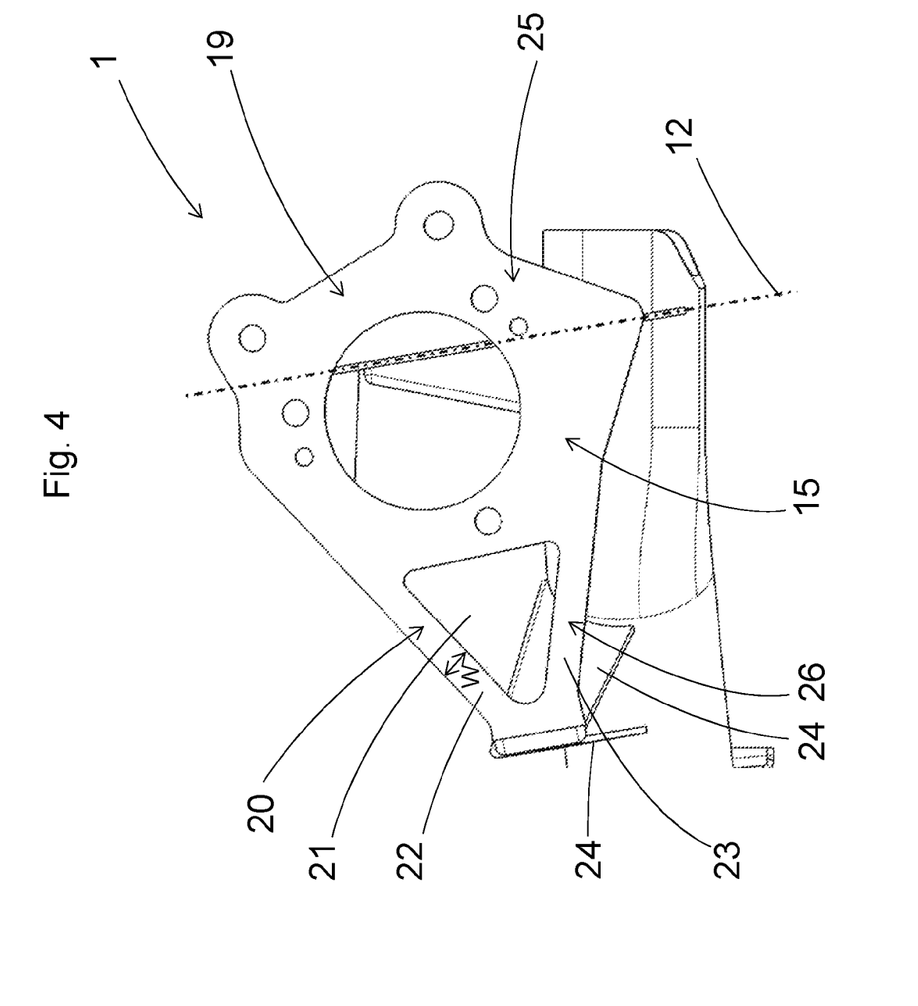
FIG. 4 shows a side view of the wheel carrier, seen from outside the vehicle.

FIG. 4 shows a side view of the wheel carrier 1, seen from outside the vehicle. In one embodiment the bearing plate 15 is substantially parallel to a wheel bearing of a wheel 4, and the bearing plate 15 comprises a first bearing plate section 19 and a second bearing plate section 20 with such properties that the second bearing plate section 20 is allowed to deflect or move in an lateral direction to the vehicle, when a lateral force $F_{lateral}$ is applied to the wheel carrier 1, e.g. during cornering or braking. Thus the properties of the supporting plate 14 and the bearing plate 15 are such that they achieve lateral force under steer, when a lateral force $F_{lateral}$ is applied to the wheel carrier 1, e.g. during cornering and brake force under steer for the wheel 4 mounted on the wheel carrier 1, when a brake force $F_{brake}$ in a contact patch with ground is applied to the wheel carrier 1, e.g. during braking.

The first bearing plate section 19 is provided in an area in contact with the center of the wheel bearing, which area is continuous. The second bearing plate section 20 is provided in front of the first bearing plate section 19. The first bearing plate section 19 and the second bearing plate section 20 are manufactured of a material of a uniform thickness, in a transversal direction of the vehicle. The uniform thickness of the bearing plate 15 simplifies and reduces the manufacturing costs.

The first bearing plate section 19, in a lateral direction of the vehicle, is provided with stiff material properties and the second bearing plate section 20 is provided with less stiff material properties than the first bearing plate section 19. Thus, the material of the bearing section (19) having a stiffness which is higher than the stiffness of the material of the second bearing section (20.

In one embodiment the dissimilar properties in the lateral direction of the first and second bearing plate sections 19, 20 are created by means of one or more apertures in the second bearing section 20. The first bearing plate section 19 is preferably separated from the second bearing plate section 20 in the area where an aperture 21 of the second bearing plate section 20 is provided. In one preferred embodiment the second bearing plate section 20 is provided with one aperture 21. Thus the second bearing plate section 20 is V-shaped, provided with a upper and a lower leg 22, 23. The width W of the first and second legs 22, 23 depend on which deflection properties that are desired. Since the first and second bearing plate sections 19, 20 preferably are manufactured of a material with similar thickness, the aperture 21 of the second bearing plate section 20 provide less stiff properties in a lateral direction of the vehicle than for the first bearing plate section 19. The second bearing plate section is fixedly attached to the rear axle body 2, preferably by means of welding.

The second bearing plate section 20 is provided with one or more bearing supporting plates 24. Preferably the bearing supporting plates 24 are provided in a front end of the second bearing plate section 20. To create stability the bearing supporting plates 24 are provided in a V-formation, and the bearing supporting plates 24 are spaced apart and attached to the rear axle body 2. The bearing supporting plates 24 are preferably welded to the second bearing plate section 20 and to the rear axle body 2.

In another embodiment the dissimilar properties in the lateral direction of the first and second bearing plate sections 19, 20 are created by means of a material which is provided with a thinner wall thickness for the second bearing plate section 20 than the material of the first bearing plate section 19, creating less stiff properties in a lateral direction of the vehicle than for the first bearing plate section 19.

The first and second bearing plate sections 19, 20 are both provided with stiff material properties in longitudinal and vertical directions of the vehicle, in order to transmit most of the longitudinal forces and a large portion of the vertical forces to the axle body 2. In a preferred embodiment first and second outer surfaces 25, 26 of the first and second bearing plate sections 19, 20 are provided in a common geometrical virtual plane. In another embodiment the first outer surface 25 of the first bearing plate section 19 and the second outer surface 26 of the second bearing plate section 20 are angled in relation to each other. The second outer surface 26 may be angled inward the vehicle, and the inclination of the second outer surface 26 may coincide with the "virtual king-pin axle" 12, seen in a longitudinal direction of the vehicle. Even more preferably the "virtual king-pin axis" 12 coincide with an angled virtual geometrical plane which extend through the second bearing plate section 20 at half the material thickness, seen in a longitudinal direction of the vehicle.

Figure 5:
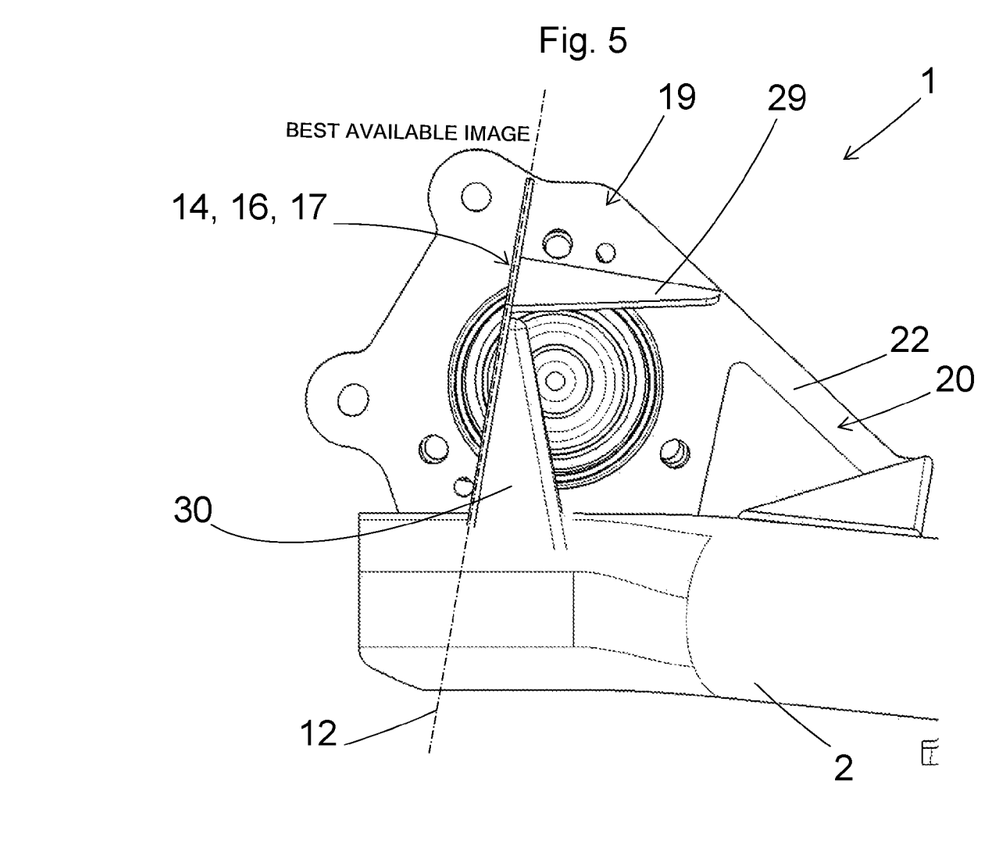
FIG. 5 shows a side view of the wheel carrier, seen from inside the vehicle.

FIG. 5 shows a side view of the wheel carrier 1, seen from an inside view of the vehicle. The supporting plate 14 is shown, and the properties of the first and second supporting sections 16, 17 are stiffer than the properties of the flexible supporting section 18 which coincide with the "virtual king-pin axle" 12. The whole supporting plate 14 is preferably arranged in an extension plane in a lateral direction of the vehicle which is close to perpendicular or perpendicular to the vertical plane 8, shown in FIG. 1. Preferably the supporting plate 14 is manufactured of a sheet steel material with homogeneous material properties.

To attain less stiff properties for the flexible supporting section 18 one or more recesses 28, seen in FIG. 3, are provided along the "virtual king-pin axis" 12, this to weaken the material. Further, the first and/or second supporting sections 16, 17 may be provided with one or more recesses and/or apertures, this to reduce the total weight of the wheel carrier 1.

The first and second supporting sections 16, 17 of the supporting plate 14 is attached to first and second supporting flanges 29, 30, respectively. The first supporting flange 29 is attached to the first bearing plate section 19 and the first supporting section 16, and the second supporting section 17 is attached to the second supporting flange 30, and the second supporting flange 30 is attached to the second supporting section 17 and to the rear axle body 2. The first bearing plate section 19 is attached to the first supporting section 16 and the second bearing plate section 20 is rigidly attached to the rear axle body 2. Further, the supporting plate and the bearing plate are manufactured of sheet metal, forged metal or die casted metal.

In FIG. 3 the wheel center 11 and the position 27 where the "virtual kingpin axle" 12 coincide with ground are shown. The longitudinal position where a lateral force $F_{lateral}$ is applied to a tire, e.g. during cornering, and the longitudinal position where the "virtual king-pin axis" 12 coincide with ground are both placed behind and outside the wheel center 11. The lateral cornering force $F_{lateral}$ is applied to the wheel 4 at a distance B behind the horizontal axle 5 through the wheel center 11. The longitudinal position where the "virtual king-pin axle" 12 coincide with ground is placed at a longitudinal distance A or B+C from the virtual vertical plane 8 through the wheel center 11. The value C is preferably larger than the value B. This gives a negative value of the caster trail. A "king-pin axis" 12 with a negative caster trail is created, this to be able to apply the lateral cornering force $F_{lateral}$ in front of the position 27 where the "virtual king-pin axis" 12 coincide with ground. By this arrangement a steering torque is created. In combination with the flexible bearing plate 15 a lateral force under steer is created.

Brake force oversteer for a twist beam rear axle suspension normally is a result of compliances in the structure. The structure of the bearing plate 15 and the supporting plate 14 are exposed for a bending moment when braking. FIG. 3 shows the "virtual king-pin axis" 12 which coincide with ground behind the wheel center 11 at a lateral perpendicular distance 0 to the virtual vertical plane through the wheel center 11. The distance 0 creates a negative scrub radii since placed outside the wheel center 11. The brake force $F_{brake}$ is applied in a contact patch for a wheel 4 with ground in a longitudinal vertical plane 8 which extends through the wheel center 11, and creates a brake force torque. A "virtual king-pin axis" 12 is created with a negative steering radii, so that the brake force $F_{brake}$ will act inside the position 27 where the "virtual king-pin axis" 12 coincide with ground. By this arrangement a steering torque is created. In combination with the supporting plate 14 a bending moment is created in the second bearing plate which create a brake force under steer.

Thus, the value of longitudinal distances B and C together with the deflection properties of the upper and lower legs 22, 23 of the second bearing plate section 20 and the flexible supporting section 18 and the position 0 of where the "virtual king-pin axle" 12 coincide with ground creates lateral force under steer and brake force under steer.

The deflection of the supporting plate 14 and the bearing plate 15 are non-plastic. The value of countersteering is the target for lateral force under steer and brake force understeer together with the value of over steer obtained from the twist beam configuration.

What is claimed is:

1. A wheel carrier mounted on a rear axle body, which wheel carrier comprises a supporting plate and a bearing plate, the supporting plate is attached to the rear axle body and the bearing plate, and the supporting plate extend in an substantially transversal direction of the vehicle, and a flexible supporting section is provided in an area where the supporting plate coincides with a "virtual king-pin axis" of the wheel carrier, wherein the properties of the supporting plate are such that the supporting plate bends around the virtual "king-pin axis" in the area of the flexible supporting section when a lateral force $F_{lateral}$ or brake force $F_{brake}$ at a tire contact patch with ground is applied to the wheel carrier, the bearing plate comprises a first bearing plate section and a second bearing plate section with such properties that the second bearing plate section is allowed to deflect in a lateral direction of the vehicle, when a lateral cornering force $F_{lateral}$ or a brake force $F_{brake}$ is applied to the carrier at the tire contact patch with ground, thus the properties of the supporting plate and the bearing plate achieve lateral force under steer and brake force under steer for the wheel mounted on the wheel carrier.

2. Wheel carrier according to claim 1, wherein the first bearing plate section is provided in an area around a center of a wheel bearing and the second bearing plate section is provided in front of the first bearing plate section, which first bearing section, in a lateral direction of the vehicle, is provided with stiff material properties and the second bearing section is provided with less stiff material properties than the first bearing section.

3. Wheel carrier according to claim 1, wherein the first and second bearing plate sections, in a longitudinal direction of the vehicle, are both provided with stiff material properties.

4. Wheel carrier according to claim 1, wherein the second bearing plate section is provided with one or more apertures that create less stiff properties in a lateral direction of the vehicle than the first bearing plate section.

5. Wheel carrier according to claim 1, wherein the second bearing section has a same wall thickness or thinner wall thickness than the first bearing section.

6. Wheel carrier according to claim 1, wherein the supporting plate comprises a first supporting section and a second supporting section, and properties of the first supporting section and the second supporting section are more stiff than properties of the flexible supporting section.

7. Wheel carrier according to claim 6, wherein the first supporting section and/or the second supporting section of the supporting plate are provided with one or more recesses and/or apertures.

8. Wheel carrier according to claim 7, wherein the first supporting section of the supporting plate is attached to a first supporting flange, and the first supporting flange is attached to the first bearing plate section and the first supporting section, and the second supporting section of the supporting plate is attached to a second supporting flange, and the second supporting flange is attached to the second supporting section and to the rear axle body.

9. Wheel carrier according to claim 7, wherein the first bearing plate section is attached to the first supporting section of the supporting plate and the second bearing plate section is rigidly attached to the rear axle body.

10. Wheel carrier according to claim 6, wherein the first supporting section of the supporting plate is attached to a first supporting flange, and the first supporting flange is attached to the first bearing plate section and the first supporting section, and the second supporting section of the supporting plate is attached to a second supporting flange, and the second supporting flange is attached to the second supporting section and to the rear axle body.

11. Wheel carrier according to claim 10, wherein the first bearing plate section is attached to the first supporting section of the supporting plate and the second bearing plate section is rigidly attached to the rear axle body.

12. Wheel carrier according to claim 6, wherein the first bearing plate section is attached to the first supporting section of the supporting plate and the second bearing plate section is rigidly attached to the rear axle body.

13. Wheel carrier according to claim 1, wherein the flexible supporting section of the supporting plate is provided with one or more recesses along the "virtual king-pin axis".

14. Wheel carrier according to claim 1, wherein the supporting plate and the bearing plate are manufactured of sheet metal, forged metal or die casted metal.

15. A rear axle body, comprising a wheel carrier mounted on the rear axle body, which wheel carrier comprises a supporting plate and a bearing plate, the supporting plate is attached to the rear axle body and the bearing plate, and the supporting plate extend in an substantially transversal direction of the vehicle, and a flexible supporting section is provided in an area where the supporting plate coincides with a "virtual king-pin axis" of the wheel carrier, wherein the properties of the supporting plate are such that the supporting plate bends around the virtual "king-pin axis" in the area of the flexible supporting section when a lateral force $F_{lateral}$ or brake force $F_{brake}$ at a tire contact patch with ground is applied to the wheel carrier, the bearing plate comprises a first bearing plate section and a second bearing plate section with such properties that the second bearing plate section is allowed to deflect in a lateral direction of the vehicle, when a lateral cornering force $F_{lateral}$ or a brake force $F_{brake}$ is applied to the carrier at the tire contact patch with ground, thus the properties of the supporting plate and the bearing plate achieve lateral force under steer and brake force under steer for the wheel mounted on the wheel carrier.

16. The rear axle body according to claim 15, wherein the first bearing plate section is provided in an area around a center of a wheel bearing and the second bearing plate section is provided in front of the first bearing plate section, which first bearing section, in a lateral direction of the vehicle, is provided with stiff material properties and the second bearing section is provided with less stiff material properties than the first bearing section.

17. The rear axle body according to claim 15, wherein the first and second bearing plate sections, in a longitudinal direction of the vehicle, are both provided with stiff material properties.

18. The rear axle body according to claim 15, wherein the second bearing plate section is provided with one or more apertures that create less stiff properties in a lateral direction of the vehicle than the first bearing plate section.

19. The rear axle body according to claim 15, wherein the second bearing section has a same wall thickness or thinner wall thickness than the first bearing section.

20. The rear axle body according to claim 15, wherein the supporting plate comprises a first supporting section and a second supporting section, and properties of the first supporting section and the second supporting section are more stiff than properties of the flexible supporting section.

* * * * *